D. M. & R. W. JACKSON.
HYDROCARBON BURNER.
APPLICATION FILED JUNE 9, 1909.

988,572.

Patented Apr. 4, 1911.

Witnesses:

Inventors:
David M. Jackson
Rolly W. Jackson
By their Attorney

UNITED STATES PATENT OFFICE.

DAVID M. JACKSON, OF BLOOMINGTON, AND ROLLY W. JACKSON, OF DANVILLE, ILLINOIS.

HYDROCARBON-BURNER.

988,572.  Specification of Letters Patent.  Patented Apr. 4, 1911.

Application filed June 9, 1909. Serial No. 501,114.

*To all whom it may concern:*

Be it known that we, DAVID M. JACKSON, a citizen of the United States, and resident of Bloomington, in the county of McLean and State of Illinois, and ROLLY W. JACKSON, a citizen of the United States, and resident of Danville, in the county of Vermilion and State of Illinois, have invented certain new and useful Improvements in Hydrocarbon-Burners, of which the following is a specification.

This invention relates to improvements in that class of hydrocarbon burners in which oil and compressed air or steam are mixed with air to produce a gas or vapor which when ignited will give a flame of large volume and intense heat.

The object of our invention is to produce an improved hydrocarbon burner which will be exceedingly simple and inexpensive in construction and which will furthermore afford greater efficiency and effectiveness.

A further object of our invention is to effectively mix the oil and compressed air or steam with the air supply directly in a mixing chamber open to the outer air and receiving in common all the fuel elements which when mixed in said chamber constitute the gas or vapor which passes therefrom to produce the flame.

The improved hydrocarbon burner constructed according to our invention embodies a generator which, in the construction herein illustrated, consists of but two parts and embodies novel features of construction and relative arrangement, substantially as hereinafter described and particularly pointed out in the claim.

Figure 1:
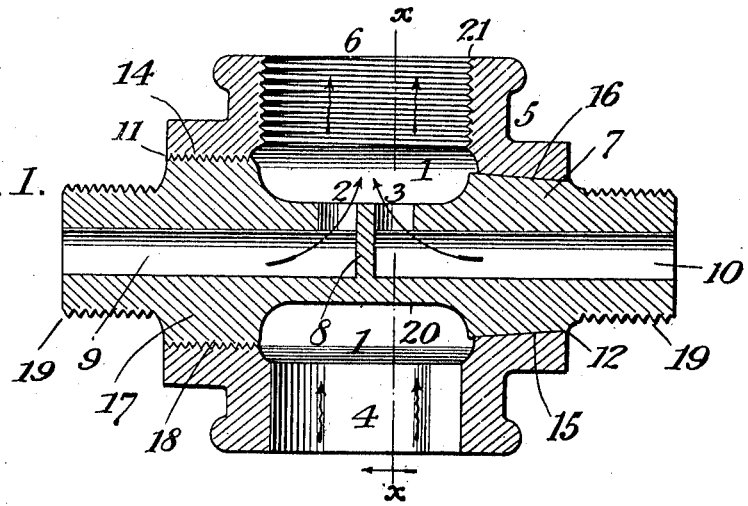
Figure 2:
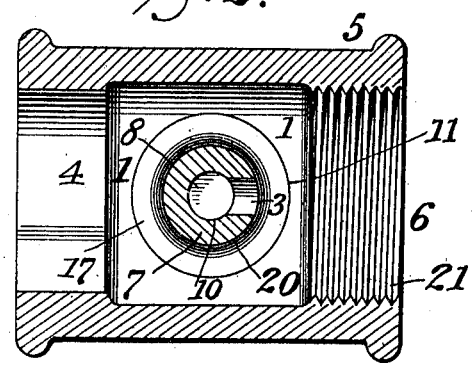
Figure 3:
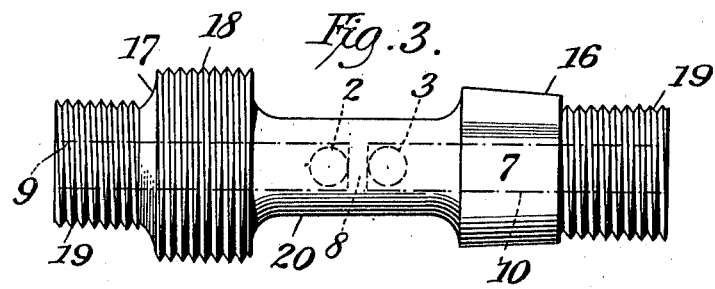

In the drawings—Figure 1 is a central horizontal cross-section of the body member constituting the mixing chamber and of the inlets to and outlet from said chamber. Fig. 2 is a vertical cross-section, taken on the line *x—x*, Fig. 1. Fig. 3 is a side view of the member constituting the inlets for the oil and compressed air or steam.

Corresponding parts in all the figures are denoted by the same reference characters.

Referring to the drawings, 1 designates a chamber directly into which enter, respectively and separately, the inlets for the oil, and compressed air or steam, and the outer air, as at 2, 3, and 4. This chamber forms a hollow space acting as an air reservoir within the body of the device, and is preferably constituted by a body member, 5, having a central internal recess or space, forming said chamber 1, said central internal recess or space being extended at one side and there open to the outer air, to constitute the inlet 4 of the outer air to the chamber or reservoir 1, and extended at the diametrically opposite side to constitute the outlet, as at 6, for the mixed gas or vapor, to which outlet a suitable ejecting nozzle or orifice is adapted to be applied. The member 5 thus consists of a shell or body internally hollowed or recessed to constitute the air reservoir and mixing chamber with extensions respectively forming the open air inlet and the fuel gas outlet.

The tubes for respectively conveying the oil and the compressed air or steam enter the chamber 1 in diametrically opposite position and at right angles to the extensions of said chamber which constitute the inlet 4 and the outlet 6. Preferably said inlet tubes are constructed in a single piece constituting a member, 7, which extends centrally and transversely across the chamber 1 and is provided with a longitudinal bore divided at the center by a partition, 8, so that the bore at one side said partition forms the oil passage, as at 9, and the bore at the other side of said partition forms the compressed air or steam passage, as at 10. The passages 9 and 10 thus enter the chamber 1 centrally and on the same plane and in diametrically opposite directions, and in the side wall of the central portion of the tube member 7, directly at each side of the central partition 8, are formed two orifices which constitute the inlets 2 and 3, which orifices face the outlet extension 6 of the chamber 1 and are at a central point with relation to said chamber 1 and outlet orifice 6, and are side by side in close association.

In the preferred construction of the two parts of the generator, consisting of the body member 1 and the tube member 7, the body member is provided in its side walls with openings, as at 11 and 12, extending from the central chamber 1 and diametrically opposite and at right angles to the inlet and outlet extensions 4 and 6 of said chamber. One of said openings, 11, is threaded, as at 14, and the other of said openings, 12, is beveled so that it converges outwardly, as at 15. The tube member 7 extends across and within the body member 5, it being inserted through the openings 11 and 12, and said tube member is provided with a beveled circumferential enlargement, 16, corresponding to and closely fitting the beveled opening 12, and with a circumferential enlargement, 17, threaded, as at 18, and fitting the threaded opening 11, and the projecting ends of said tube member, beyond said enlargements 16 and 17, are preferably threaded, as at 19, for the convenient attachment of a suitable extension tube. The central portion of the tube member 7, between the enlargements 16 and 17, which occupies the transverse space of the chamber 1, is reduced in diameter, as at 20, so that the interior area or space of the chamber 1 is not greatly diminished, and said chamber area or space extends entirely around the reduced central portion 20 of the tube member 7 which projects transversely across the chamber and has the orifices 2 and 3 entering said surrounding space. The extension 6 of the chamber 1 is preferably interiorly threaded, as at 21, for the convenient attachment of an extension or nozzle as desired.

In the construction as above described the body member 5 thus consists substantially of a four-way coupling, the central area or space of which constitutes the mixing chamber, while the two main diametrically-opposite extensions of said chamber constitute the inlet and outlet spaces 4 and 6, and the two other extensions at right angles thereto constitute the openings for the tube member 7 which passes transversely across and through said four-way coupling at right angles to the inlet and outlet spaces 4 and 6 and occupies the central plane of the chamber 1 and is surrounded by the interior area or space thereof. Suitable valves may of course be employed with relation to the oil passage 9, the compressed air or steam passage 10, the outlet 6, and the inlet 4, to control or adjust the feed supply and the outlet, as desired.

The operation and advantages of our invention will be readily understood by those skilled in the art to which it appertains. The central mixing chamber 1 is open to the outer air at the rear inlet-extension 4, so that the air circulates freely within the area or space of said chamber and around the transverse tube member 7, thus affording a general mixing chamber of large and effective area into which all the fuel elements separately enter and are mixed and from which the gas or vapor thus produced is discharged at the outlet-extension 6. The relative arrangement of the oil and compressed air or steam supply to the chamber 1, into which the oil passage and the compressed air or steam passage enter the chamber at diametrically opposite sides and directly on the same transverse plane, at right angles to the extension-inlet 4 for the outside air, and have their respective orifices side by side and centrally in the chamber and facing the interior area or space thereof toward the extension-outlet 6, provides for the direct associate contact of the oil and compressed air or steam at one point as they enter the general mixing chamber 1 and mix therein with the outer air which fills said chamber, whereby a direct and more effective protection of the gas or vapor is secured. It will be understood that the crude oil is forced into the mixing chamber 1 under low air pressure, while the air supply passes into the chamber by suction, and that for the mixing jet either compressed air or steam may be employed, by the action of which the oil and air are effectively mixed in the chamber and forced therefrom at the extension-outlet 6, when the mixed elements come into contact with the outer air and the gas or vapor thus produced gives when ignited a flame which, by reason of the improved construction and relative arrangement as comprised in our invention and improvements, is particularly effective in volume and in intensity of heat.

It will be understood that our invention and improvements are adapted for effective use in firing and heating steam boilers, smelters, dry furnaces, forges, and for all other uses and under all conditions in which a fluid gas or vapor fuel can be employed. It will be understood that our improved generator may be effectively employed in the production of gas or vapor for use at any convenient or desired point where natural or other gases can be effectively employed, by connecting a service line at the extension-outlet 6.

We do not desire to be understood as limiting ourselves to the detail features and construction and arrangement of parts as herein shown and described, as it is manifest that variations and modifications therein may be resorted to, in the adaptation of our invention to varying conditions of use, without departing from the spirit and scope of our invention and improvements. We therefore reserve the right to all such variations and modifications as properly fall within the scope of our invention and the terms of the following claim.

Having thus described our invention, we claim and desire to secure by Letters Patent:

A hydrocarbon device of the class described, comprising an integral four-way body member forming an interior central mixing chamber in common for all the fuel elements which enter therein and produce the gas or vapor, the ways of said body member forming respectively an inlet for the outer air at one side of said chamber and an outlet for the gas or vapor at the opposite side of said chamber and openings at opposite sides and at right angles to said air inlet and said outlet, and an integral tube member inserted in and extending through said integral four-way body member transversely to said air-inlet way and said outlet way and conforming to and fitting the openings formed by two ways of said body member, said integral transverse tube member being divided into respective passages for oil and compressed air or steam by the partition 8 intersecting its bore and having at each side of said partition orifices in its walls directly opening at right angles to the bore of said integral tube member and toward the outlet-way of said integral four-way body member, substantially as and for the purpose set forth.

In testimony whereof we have signed our names in the presence of the subscribing witnesses.

D. M. JACKSON.
ROLLY W. JACKSON.

Witnesses for David M. Jackson:
D. V. MYERS,
J. F. TIEDKE.

Witnesses for Rolly W. Jackson:
HENRY J. HALL, Jr.,
CHAS. TER GOSSETT.

Copies of this patent may be obtained for five cents each, by addressing the "Commissioner of Patents, Washington, D. C."